US007012760B2

(12) United States Patent
Matsushima et al.

(10) Patent No.: US 7,012,760 B2
(45) Date of Patent: Mar. 14, 2006

(54) LENS BARREL (75) Inventors: Teruaki Matsushima, Saitama (JP);
Koji Ohgaki, Saitama (JP)

(73) Assignee: Fujinon Corporation, Saitama (JP)

( * ) Notice: Subject to any disclaimer, the term of this patent is extended or adjusted under 35 U.S.C. 154(b) by 3 days.

(21) Appl. No.: 10/786,414

(22) Filed: Feb. 26, 2004

(65) Prior Publication Data

US 2004/0174620 A1  Sep. 9, 2004

(30) Foreign Application Priority Data

Mar. 3, 2003  (JP) .............................. 2003-055587

(51) Int. Cl.
*G02B 15/14* (2006.01)
(52) U.S. Cl. ...................... 359/699; 359/700; 359/701; 359/702; 359/819; 359/822
(58) Field of Classification Search ................ 359/394, 359/699, 700, 701, 702, 704, 825, 823, 819, 359/822
See application file for complete search history.

(56) References Cited

U.S. PATENT DOCUMENTS

| 5,886,832 A | * | 3/1999 | Ihara ........................... 359/700 |
| 6,120,865 A | * | 9/2000 | Nomura et al. ............ 428/36.9 |
| 6,611,663 B1 | * | 8/2003 | Nakagawa .................... 396/62 |

FOREIGN PATENT DOCUMENTS

| JP | 57-210304 | 12/1982 |
| JP | 08-304688 | 11/1996 |

* cited by examiner

*Primary Examiner*—Ricky L. Mack
*Assistant Examiner*—Brandi Thomas
(74) *Attorney, Agent, or Firm*—Harness, Dickey & Pierce, P.L.C.

(57) ABSTRACT

To the female helicoidal screw of the lens barrel (outer barrel body), there is always imparted a biasing force from a plurality of looseness eliminating springs formed on the outside peripheral portion of the lens barrel (inner barrel body) which are integrally supported on the lens barrel (inner barrel body), by means of the male helicoidal screw, and the male helicoidal screw is slid while being thrusted against the female helicoidal screw.

20 Claims, 6 Drawing Sheets

LENS BARREL

BACKGROUND OF THE INVENTION

1. Field of the Invention

The present invention relates to a lensbarrel, and more particularly to a lens barrel which performs focus adjustment, variable power and the like by moving a lens group in an optical axis direction in a projector, a camera and the like.

2. Description of the Related Art

In the projector, the camera and the like, as a moving system for moving the lens group in an optical axis direction for focus adjustment and variable power, there is known a helicoidal system using a helicoidal screw. The helicoidal system is a system in which an inner barrel body for holding a lens, and an outer barrel body for being rotationally driven are threadedly engaged and coupled by means of a helicoidal screw, and the inner barrel body is moved along an optical axis by means of a feeding operation of the helicoidal screw by rotating the outer barrel body:

In the case of the helicoidal system, it is not easy to manufacture helicoidal screws such that male and female helicoidal screws are caused to be threadedly engaged without looseness, but for example, when there occurs looseness in a thrust direction, a so-called backlash occurs to cause a position of the lens to be shifted. When molding is performed with little clearance between the male and female helicoidal screws in order to cope with such looseness, there is a problem that in addition to torque of rotation increased due to an increase in friction, it takes a great deal of time to adjust a die during molding of the helicoidal screws.

Conventionally, there has been a lens barrel (See Japanese Patent Application Publication No. 57-210304), in which a spring piece for pressing is provided at a male helicoidal screw portion of the inner barrel body, and this spring piece is thrusted against a thread of the female helicoidal screw of the outer barrel body, whereby looseness which occurs on the helicoidal screw is eliminated.

Also, there has been a lens barrel (See Japanese Patent Application Publication No. 8-304688), in which the outer barrel body is divided and arranged in a thrust direction and each of the outer barrel bodies obtained by the division is coupled through a coupling member having an elastic force in a thrust direction. Thereby, a biasing force in the thrust direction is imparted to the outer barrel bodies thus divided to each other, and this biasing force brings the male helicoidal screw to intimate contact with the female helicoidal screw to make it possible to eliminate looseness of the helicoidal screw in the thrust direction. Further, since this coupling member is provided with a spring piece, and this spring piece is thrusted against the thread of the male helicoidal screw of the inner barrel body, looseness of the helicoidal screw in the radial direction can be also eliminated.

The lens barrel described in the Japanese Patent Application Publication No. 57-210304 has, however, had a disadvantage that the biasing force of the spring piece wears the thread of the female helicoidal screw early. Also, the lens barrel described in Japanese Patent Application Publication No. 8-304688 has had a disadvantage that the torque of rotation is increased due to high friction on the screw surface in addition to an increased number of components.

SUMMARY OF THE INVENTION

The present invention has been achieved in view of the above-described state of affairs, and is aimed to provide a lens barrel having simple structure, eliminating looseness of the helicoidal screw, and enabling a light rotating operation of the helicoidal screw.

In order to achieve the above-described object, there is provided a lens barrel according to a first aspect of the present invention, comprising: an inner barrel body with a helicoidal screw formed; and an outer barrel body with a helicoidal screw formed, which is coupled with the inner barrel body by means of the helicoidal screw and a helicoidal screw formed on the inner barrel body, wherein, of the helicoidal screws formed on the outer barrel body and the inner barrel body, one helicoidal screw is formed on an elastic piece formed by slitting one portion of the barrel body, and the elastic piece is thrusted against the other helicoidal screw by the biasing force of the elastic piece.

According to the first aspect of the present invention, since, of the helicoidal screws formed on the outer barrel body and the inner barrel body, the helicoidal screw on one side is slid while being thrusted against the helicoidal screw on the other side by means of the biasing force of the elastic piece formed by slitting one portion of the barrel body, the looseness of the helicoidal screw can be eliminated. Specifically, the elastic piece formed on the inner barrel body is formed with a male helicoidal screw, and the male helicoidal screw of the elastic piece is thrusted against the female helicoidal screw of the outer barrel body. Thereby, since the male helicoidal screw is brought into intimate contact with the female helicoidal screw, the looseness concerned can be eliminated. Also, since this elastic piece has been integrally molded with the barrel body, the components will not be increased, but the manufacturing cost can be reduced. In this respect, since the elastic piece and the helicoidal screws can be formed at least on either the outer barrel body or the inner barrel body, the structure may be arranged such that a female helicoidal screw is formed on the inside peripheral portion of the outer barrel body by means of an elastic piece and the female helicoidal screw is thrusted against the male helicoidal screw of the inner barrel body.

In the first aspect of the present invention, a plurality of the above-described elastic pieces may be formed on the above-described inner barrel body at predetermined intervals. According to this aspect, the elastic pieces are capable of reliably transmitting the torque of rotation to the outer barrel body.

In order to achieve the above-described object, there is provided a lens barrel according to a second aspect of the present invention, comprising: an inner barrel body with a helicoidal screw formed on an outside surface; and an outer barrel body with a helicoidal screw formed on an inside surface, which accommodates the inner barrel body by causing a helicoidal screw formed on the inner barrel body to threadedly engage with the helicoidal screw formed on the inside surface, wherein, of the outer barrel body and the inner barrel body, the helicoidal screw formed on one barrel body is formed on an elastic piece formed by slitting one portion of the one barrel body in a peripheral direction, and the elastic piece is thrusted, by the biasing force of the elastic piece, against the helicoidal screw formed on the other barrel body.

According to the second aspect of the present invention, since, of the helicoidal screws formed on the outer barrel body and the inner barrel body, the helicoidal screw on one side is slid while being thrusted against the helicoidal screw on the other side by means of the biasing force of the elastic piece formed by slitting one portion of the barrel body, looseness of the helicoidal screw can be eliminated. Specifically, the elastic piece formed on the inner barrel body is formed with a male helicoidal screw, and the male helicoidal screw of the elastic piece is thrusted against the female helicoidal screw of the outer barrel body. Thereby, since the male helicoidal screw is brought into intimate contact with the female helicoidal screw, the looseness concerned can be eliminated. Also, since this elastic piece is integrally formed with the barrel body, the components will not be increased, but the manufacturing cost will be able to be reduced. In this respect, since the elastic piece and the helicoidal screws can be formed at least on either the outer barrel body or the inner barrel body, the structure may be arranged such that a female helicoidal screw is formed on the inside peripheral portion of the outer barrel body by means of an elastic piece and the female helicoidal screw is thrusted against the male helicoidal screw of the inner barrel body.

In the second aspect of the present invention, a plurality of the above-described elastic pieces may be formed on the above-described inner barrel body at predetermined intervals. Also, it may be possible to form the elastic piece in a substantially rectangular shape.

According to a lens barrel of the present invention as described above, since an elastic piece obtained by slitting one portion of the barrel body has been formed with a helicoidal screw, it is possible to eliminate looseness of the helicoidal screw in simple structure.

DETAILED DESCRIPTION OF THE PREFERRED EMBODIMENTS

Figure 1:
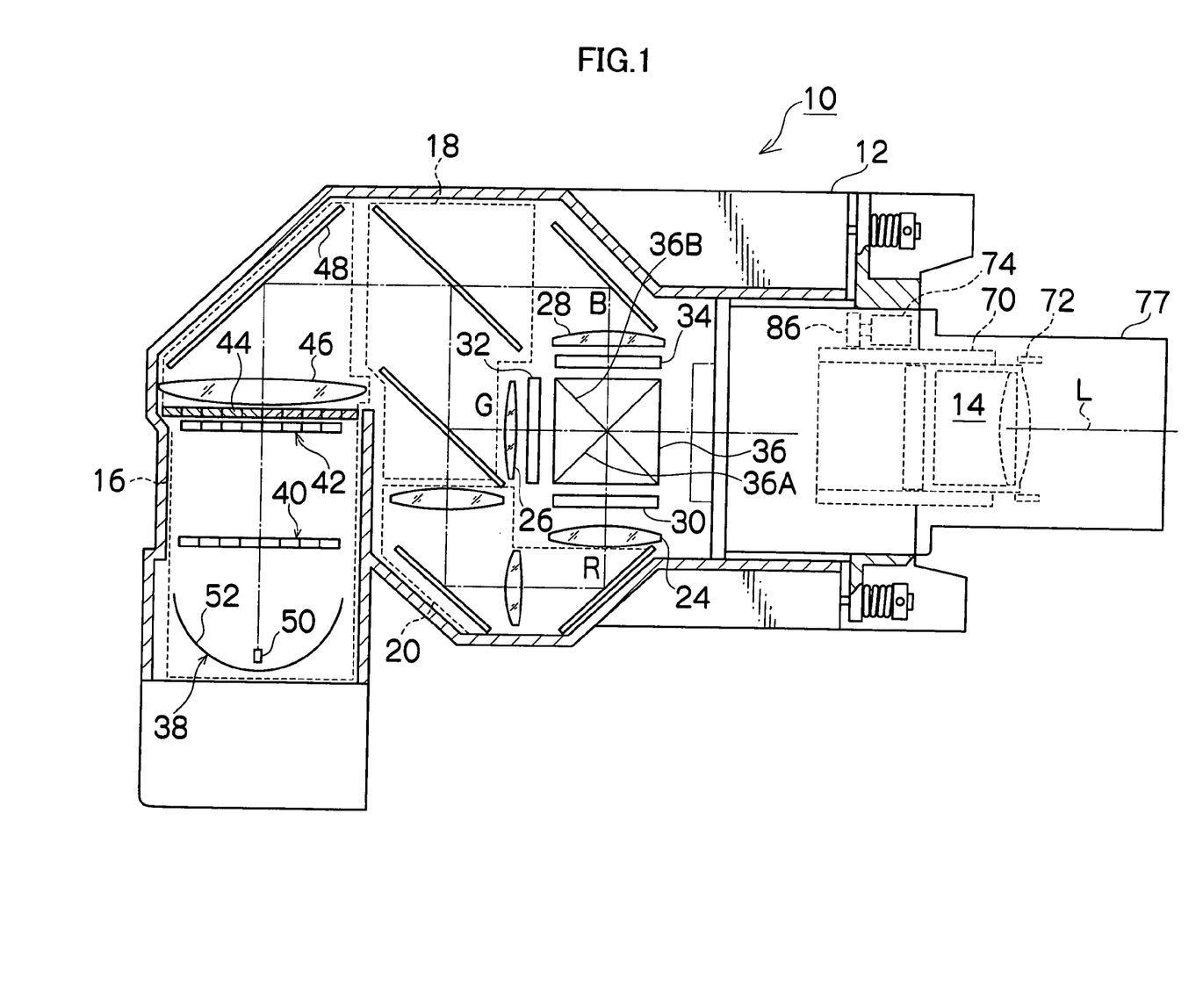
FIG. 1 is a plan view showing a liquid crystal projector to which a lens barrel according to an embodiment of the present invention has been applied.

Hereinafter, with reference to the accompanying drawing, the detailed description will be made of a lens barrel according to a preferred embodiment of the present invention. FIG. 1 is a structural view showing a liquid crystal projector in which a lens barrel of the present invention has been applied to a projection lens device. This liquid crystal projector 10 comprises: a projector body 12 constructed in a box shape; a projection lens device 14 (indicated with a broken line on FIG. 1); and the like. In this respect, reference numeral 77 designates a lens hood for protecting the projection lens device 14.

In the projector body 12, there are disposed an illumination system 16, a color-light separation system 18, a light guide system 20, three pieces of field lenses 24, 26, 28, three liquid crystal panels for R, G and B, a cross-dichroic prism 36 and the like at their respective predetermined positions respectively.

The illumination system 16 includes: a light source 38; two pieces of lens arrays 40, 42; a polarization conversion element 44; a condensing lens 46; and a reflection mirror 48. The light source 38 includes: a high-pressure mercury lamp 50; and a reflection umbrella 52, and this reflection umbrella 52 is formed like a concave mirror in such a manner that radiation light emerging from the high-pressure mercury lamp 50 becomes incident on the polarization conversion element 44 as a substantially parallel bundle of rays.

A light beam that has transmitted through the polarization conversion element 44 is converged by the condensing lens 46, and thereafter, is total-reflected by the reflection mirror 48 to become incident on the color-light separation system 18. The color-light separation system 18 separates this light beam into three colors: R, G and B. The light beams thus separated pass through the field lenses 24, 26, 28 to illuminate the liquid crystal panels 30, 32, 34.

The liquid crystal panels 30, 32, 34 modulate an image signal outputted from a liquid crystal driving unit (not shown) into three color light respectively to display the images thus modulated. This image is illuminated by emerging light of the field lens 24, 26, 28, and each of their transmitted image light is incident on the cross-dichroic prism 36. In the cross-dichroic prism 36, a red-reflected dielectric multi-layer film 36A and a blue-reflected dielectric multi-layer film 36B are formed in a cross shape, where each of the above-described image light is composed. The image light thus composed emerges from the cross-dichroic prism 36 toward the projection lens device 14, is projected on a screen (not shown) by the projection lens device 14, and a color image is projected on the screen.

Figure 2:
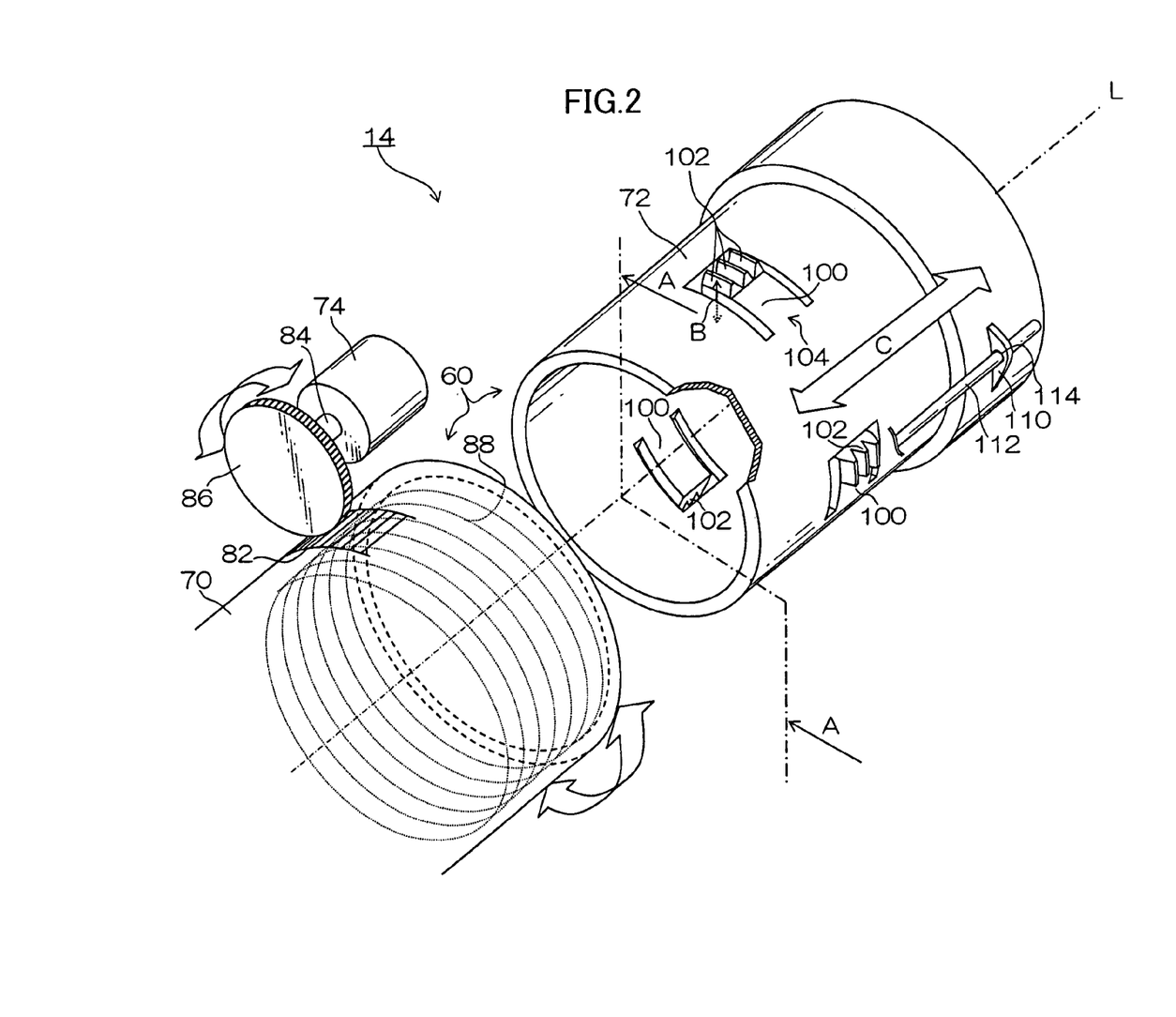
FIG. 2 is a perspective view showing structure of a lens barrel according to the embodiment of the present invention.

The projection lens device 14 is, as shown in FIG. 2, including: a lens barrel 60 comprising an outer barrel body 70 and an inner barrel body 72; a driving motor 74; and the like.

The outer barrel body 70 is pivotally supported on a fixed barrel (not shown) of the projection lens device 14. On the inside peripheral portion of the outer barrel body 70, there is formed a female helicoidal screw 88. Also, on the outside peripheral portion of the outer barrel body 70, there is formed a gear 82, and with this gear 82, there is meshed a gear 86 mounted to an output shaft 84 of the motor 74.

Figures 3A, 3B:
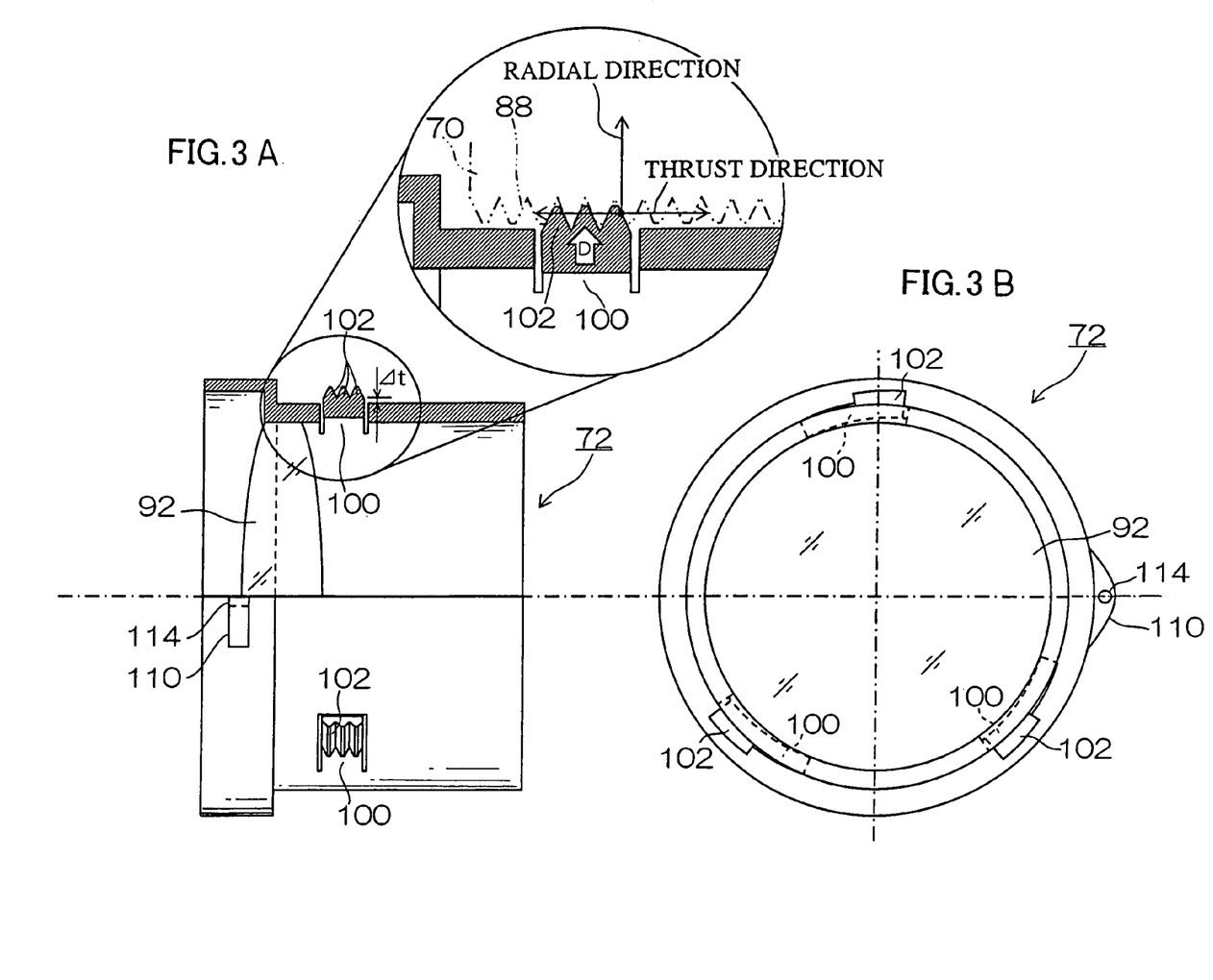
FIGS. 3A and 3B are a sectional view in A—A arrow view of FIG. 2 and a side view showing a lens barrel according to the embodiment of the present invention respectively.

On the other hand, the inner barrel body 72 has a focus lens group 92 mounted therein. Also, elastic pieces 100, are formed at three places on the outer peripheral portion of the inner barrel body 72 as shown in FIGS. 2, 3A, and 3B. This elastic piece 100 is integrally formed with the inner barrel body 72, and is formed so as to be able to deflect with a base 104 coupled to the inner barrel body 72 as a fulcrum by slitting the peripheral portion of the inner barrel body 72 in a substantially square shape (arrow B on FIG. 2). At the tip end of each of these elastic pieces 100, there is formed a male helicoidal screw 102 which threadedly engages with the female helicoidal screw 88. Also, the position of the elastic piece 100 has been set to be At higher than the outer peripheral portion of the inner barrel body 72 in such a manner that a predetermined biasing force is imparted from the male helicoidal screw 102 to the female helicoidal screw 88 when the female helicoidal screw 88 threadedly engages with the male helicoidal screw 102 as shown in FIGS. 3A and 3B.

Further, in FIG. 2, a rotation regulating member 110 is projectingly provided on the inner barrel body 72, and in a hole 114 penetrated and formed in parallel with an optical axis L of this rotation regulating member 110, there is fitted a guide bar 112 extendedly provided from a back plate of the projection lens device 14. Thereby, the inner barrel body 72 is moved to and fro in the direction of the optical axis L while the rotation with the optical axis L being centered is being regulated by the guide bar 112.

Next, the description will be made of an operation of the projection lens device 14 according to the present invention.

A driving force of the driving motor 74 is transmitted to the outer barrel body 70 from the gear 86 by means of the gear 82, and when the outer barrel body 70 is rotated with the optical axis L as the center, the inner barrel body 72 is moved to and fro along the direction of the optical axis L by means of a feeding operation of the helicoidal screws 88, 102 and a rectilinear propagation operation of the guide bar 112 (arrow C on FIG. 2). By this to-and-fro movement, focusing is performed. On this occasion, in FIG. 3A, to the female helicoidal screw 88 of the outer barrel body 70, a biasing force is always imparted from the elastic piece 100 supported on the inner barrel body 72 by means of the male helicoidal screw 102, and the male helicoidal screw 102 is slid while being thrusted against the female helicoidal screw 88 (arrow D on FIG. 3A). Therefore, the male helicoidal screw 102 is brought into intimate contact with the female helicoidal screw 88, and there can be eliminated looseness in the radial direction and in the thrust direction which occurs between the male helicoidal screw 102 and the female helicoidal screw 88. Thus, since the male helicoidal screw 102 locally comes into contact with the female helicoidal screw 88, there can be solved problems such as increased torque of rotation due to sliding friction and worn thread by reducing a contact area between the male and female helicoidal screws. Further, since a plurality of elastic pieces 100 have been formed on the outer peripheral portion of the inner barrel body 72, the torque of rotation can be reliably transmitted and it becomes difficult for the male helicoidal screw 102 to disengage from the female helicoidal screw 88.

In this respect, the installation places of the elastic piece 100 and the male helicoidal screw 102 are not limited to the places described avobe. When installed only at two places on the outer peripheral portion of the inner barrel body 72, looseness in the radial direction is prone to occur, and when installed at a multiplicity of places, it becomes difficult to reduce the manufacturing cost during molding. Therefore, it is preferable to install at three to six places at predetermined intervals.

Figure 4:
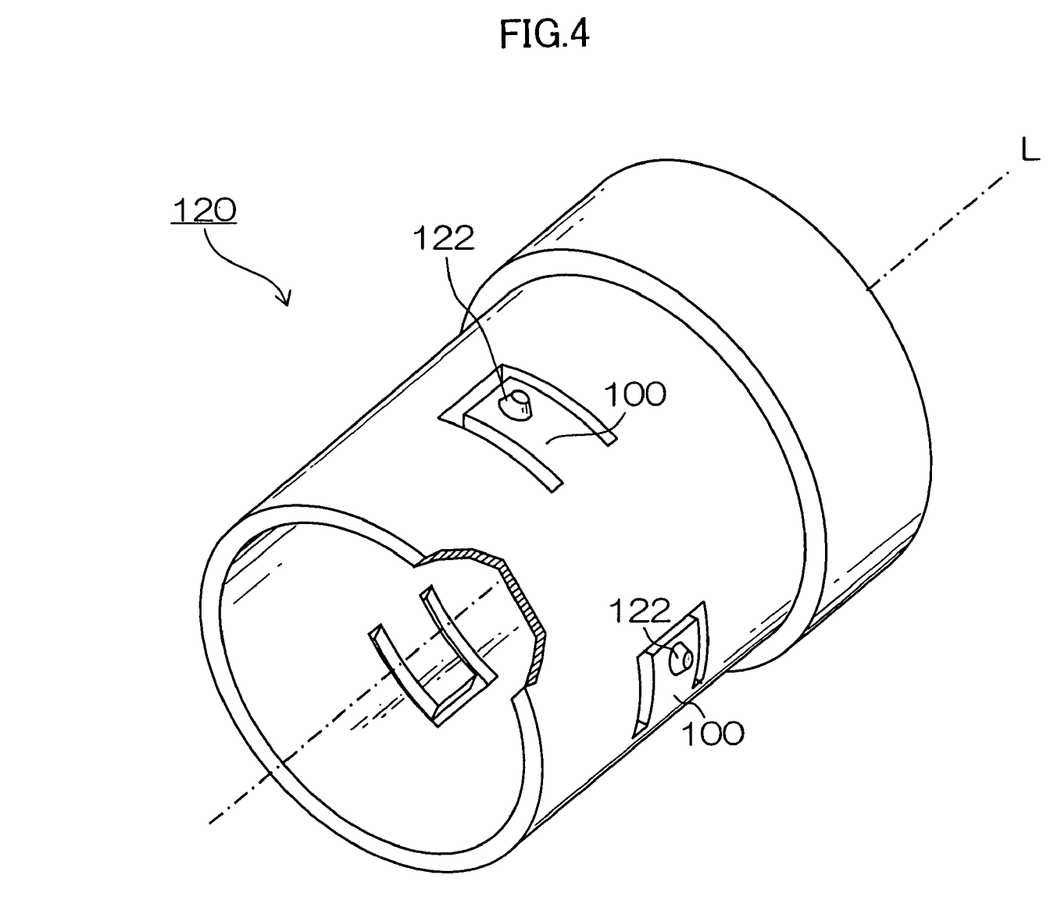
FIG. 4 is a perspective view showing structure of a lens barrel according to another embodiment of the present invention.

FIG. 4 shows a lens barrel according to another embodiment of the present invention. On this inner barrel body 120, there is formed a truncated cone-shaped pin 122 capable of threadedly engaging with the female helicoidal screw 88 (See FIG. 2) on the elastic piece 100. Even in the inner barrel body 120 having such structure, since a pin 122 is brought into intimate contact with the female helicoidal screw 88 by an operation of the elastic piece 100, a similar effect to the projection lens device 14 shown in FIG. 2 can be obtained.

Figure 5:
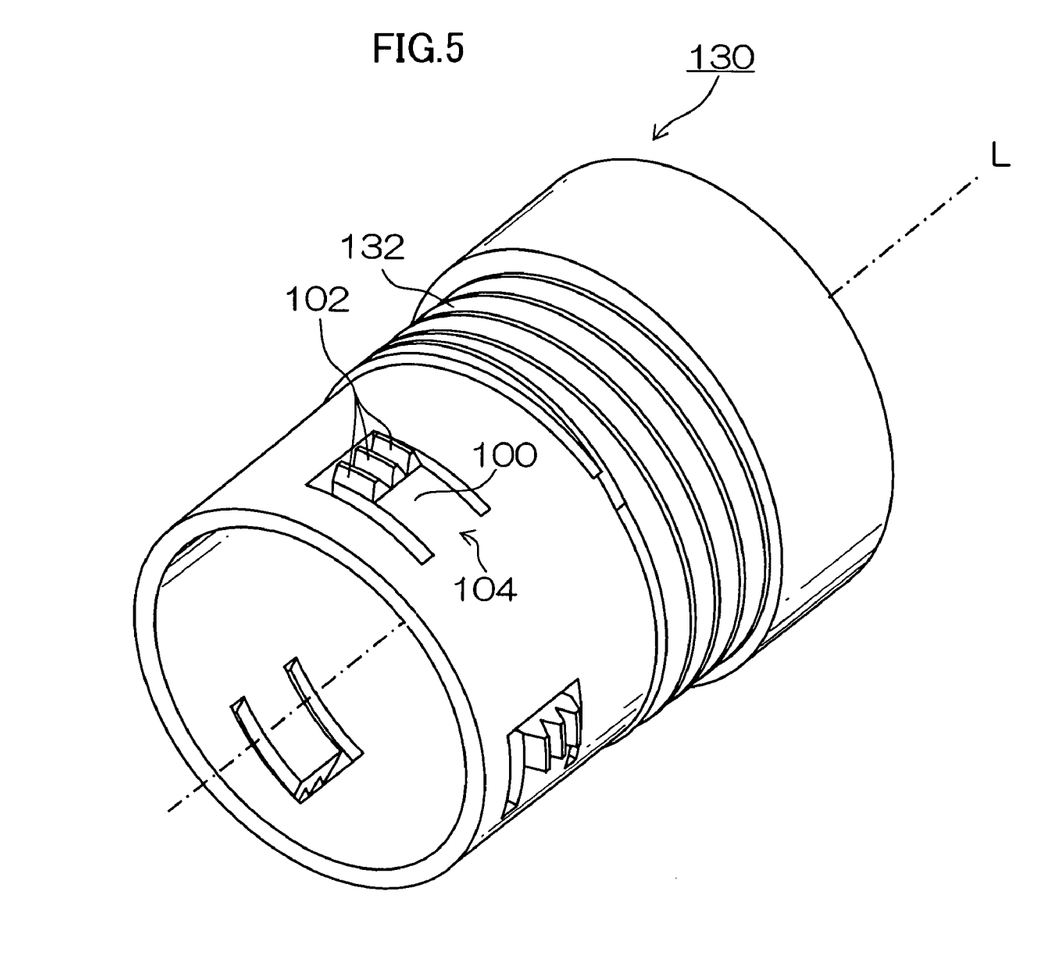
FIG. 5 is a perspective view showing structure of a lens barrel according to another embodiment of the present invention.

Further, the inner barrel body 130 shown in FIG. 5 is formed with a male helicoidal screw 132 and a male helicoidal screw 102 of the elastic piece 100. Since it receives, by the male helicoidal screw 132, an impact load from the outside to be applied on the inner barrel body 130, the inner barrel body 130 having the above-described structure is capable of preventing the elastic piece 100 from being damaged by eliminating looseness of the helicoidal screw and preventing concentration of the impact load on the base 104 of the elastic piece 100.

Figure 6:
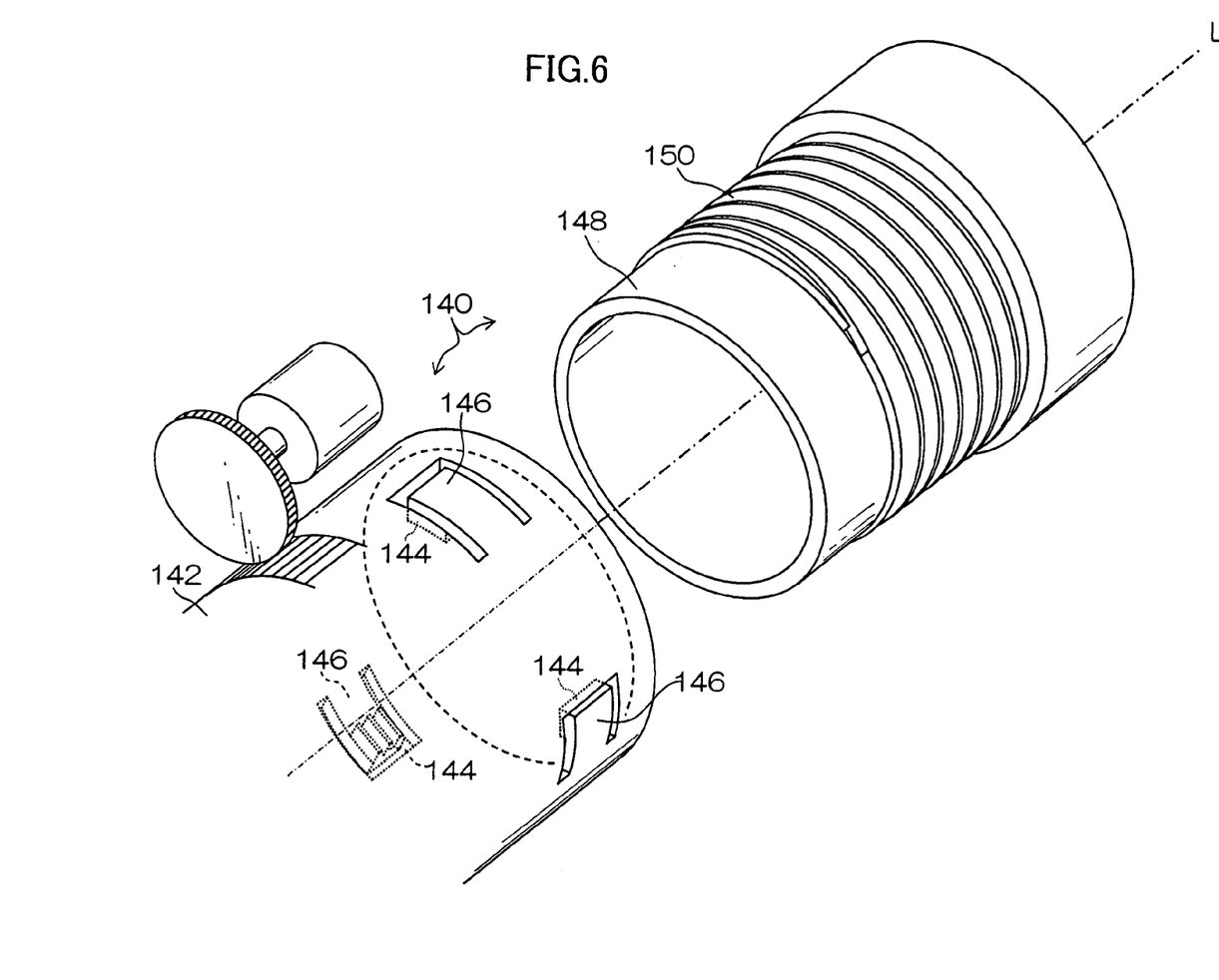
FIG. 6 is a perspective view showing structure of a lens barrel according to another embodiment of the present invention.

FIG. 6 shows a lens barrel according to another embodiment. This lens barrel 140 is obtained by integrally forming elastic pieces 146 each of which has been formed with a female helicoidal screw 144, at three places on an outer barrel body 142 and further forming a male helicoidal screw 150 on the outside peripheral portion of an inner barrel body 148. To the male helicoidal screw 150, a biasing force is always imparted from the elastic pieces 146 by means of the female helicoidal screw 144, and the male helicoidal screw 150 is slid while being thrusted against the female helicoidal screw 144. Therefore, there can be eliminated looseness that occurs between the female helicoidal screw 144 and the male helicoidal screw 150. Also, since the plurality of elastic pieces 146 have been formed on the outside peripheral portion of the inner barrel body 72, the similar effect to the projection lens device 14 shown in FIG. 2 can be obtained. In this respect, as regards an operation of the lens barrel 140 having the structure shown in FIG. 6, the description of the lens barrel 140 will be omitted because it is basically the same as the projection lens device 14.

As described above, according to the lens barrel described in the present embodiment, since, of the helicoidal screws formed on the outer barrel body and the inner barrel body, the helicoidal screw on one side is slid while being thrusted against the helicoidal screw on the other side by means of a biasing force of an elastic piece formed by slitting one portion of the barrel body, looseness of the helicoidal screw can be eliminated.

Also, since this elastic piece has been integrally formed with the barrel body, the manufacturing cost can be reduced. In particular, since the elastic piece has been formed by slitting one portion of the barrel body, the elastic piece can be easily formed.

Further, since a plurality of these elastic pieces have been formed on the peripheral portion of the barrel body, the torque of rotation can be reliably transmitted.

In this respect, in the above-described embodiment, the elastic piece 100, 146 has been formed in a substantially rectangular shape, and in a lens barrel according to the present invention, the elastic piece may be also formed in a triangular shape or in a U-character shape.

Also, as regards the lens barrel shown in the present embodiment, there has been shown an example in which it has been applied to a lens barrel of focus system, and it may be applied to a lens barrel of zoom system. Also, the present invention can be applied to not only a liquid crystal projector, but also general lens barrel of optical apparatus such as cameras.

What is claimed is:

1. A lens barrel, comprising:
   an inner barrel body with a helicoidal screw formed; and
   an outer barrel body with a helicoidal screw formed, which is coupled with said inner barrel body by means of said helicoidal screw and a helicoidal screw formed on said inner barrel body,
   wherein, of the helicoidal screws formed on said outer barrel body and said inner barrel body, one helicoidal screw is formed on an elastic piece formed by slitting one portion of the barrel body, and said elastic piece is thrusted against the other helicoidal screw by a biasing force of said elastic piece.

2. The lens barrel according to claim 1, wherein there are formed a plurality of said elastic pieces on said inner barrel body at predetermined intervals.

3. A lens barrel, comprising:
   an inner barrel body with a helicoidal screw formed on an outside surface; and
   an outer barrel body with a helicoidal screw formed on an inside surface, which accommodates said inner barrel body by causing a helicoidal screw formed on said inner barrel body to threadedly engage with a helicoidal screw formed on said inside surface, wherein, of said outer barrel body and said inner barrel body, the helicoidal screw formed on one barrel body is formed on an elastic piece formed by slitting one portion of said one barrel body in a peripheral direction, and said elastic piece is thrusted, by a biasing force of said elastic piece, against the helicoidal screw formed on the other barrel body.

4. The lens barrel according to claim 3, wherein there are formed a plurality of said elastic pieces on said inner barrel body at predetermined intervals.

5. The lens barrel according to claim 3, wherein said elastic piece has been formed in a substantially rectangular shape.

6. The lens barrel according to claim 1, wherein said outer barrel body includes a plurality of said elastic pieces at a plurality of intervals.

7. The lens barrel according to claim 1, wherein said elastic piece has been formed in one of a substantially rectangular shape, a substantially triangular shape, and a substantially U-character shape.

8. A projector comprising the lens barrel according to claim 1.

9. The lens barrel according to claim 3, wherein said outer barrel body includes a plurality of said elastic pieces at a plurality of intervals.

10. The lens barrel according to claim 3, wherein said elastic piece has been formed in one of a substantially triangular shape and a substantially U-character shape.

11. A projector comprising the lens barrel according to claim 3.

12. A lens barrel, comprising:
an inner barrel body with a screw structure; and
an outer barrel body with a screw structure configured to be coupled with said inner barrel body via the screw structures, at least a portion of one of the screw structures, formed on an elastic tab structure integrally formed from a portion of at least one of the inner and outer barrel body, being thrust against part of the other screw structure via a biasing force of the elastic tab structure upon the screw structures being coupled.

13. The lens barrel according to claim 12, wherein at least one of said inner and outer barrel body includes a plurality of said elastic tab structures at a plurality of intervals.

14. The lens barrel according to claim 13, wherein each portion of the screw structure formed on said plurality of said elastic tab structures include portions of a helicoidal screw.

15. The lens barrel according to claim 14, wherein the screw structure on at least one of said inner and outer barrel body further includes a helicoidal screw on the barrel body from which said elastic tab structure is integrally formed, distinct from said portions of a helicoidal screw.

16. The lens barrel according to claim 13, wherein said screw structures formed on said plurality of said elastic tab structures are truncated cone-shaped pins.

17. The lens barrel according to claim 12, wherein said screw structure formed on the elastic tab structure is a truncated cone-shaped pin.

18. The lens barrel according to claim 12, wherein at least one of said inner and outer barrel body includes a plurality of said elastic tab structures at a plurality of intervals.

19. The lens barrel according to claim 12, wherein said elastic tab structure has been formed in one of a substantially triangular shape and a substantially U-character shape.

20. A projector comprising the lens barrel according to claim 12.

* * * * *